A. P. MASON.
Bridle-Bits.
No. 150,696.
Patented May 12, 1874.
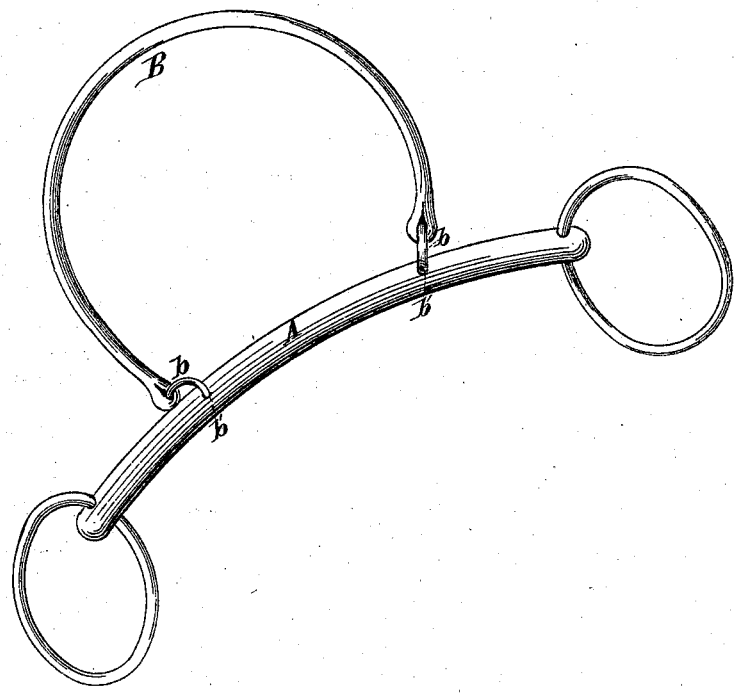
Witnesses
Inventor

UNITED STATES PATENT OFFICE.

ARNOLD P. MASON, OF OLEAN, NEW YORK, ASSIGNOR OF ONE-HALF HIS RIGHT TO GEORGE D. HOMER, OF SAME PLACE.

IMPROVEMENT IN BRIDLE-BITS.

Specification forming part of Letters Patent No. 150,696, dated May 12, 1874; application filed April 9, 1874.

*To all whom it may concern:*

Be it known that I, ARNOLD P. MASON, of Olean, in the county of Cattaraugus and State of New York, have invented a certain new and useful Improvement in Bridle-Bits, of which the following is a full, clear, and exact description, reference being had to the annexed drawing, in which the figure illustrates a perspective view of my improved bridle-bit.

This invention relates to an improvement in bridle-bits; and it consists in providing such a bit with a bow, made from leather, chain, or other suitable material, of sufficient length to pass around over the upper teeth, and under the upper lip, of the horse or animal, and having its ends united, by rings or otherwise, either to the mouth-bar, short distances inwardly from, or directly to, the extremities, or to the rein-rings thereof, substantially as hereinafter more fully set forth.

To enable others to make and use my invention, I will proceed to describe it.

In the annexed drawing, A refers to the mouth-bar of the bit, formed of some flexible or inflexible material, and supplied at its extremities with the usual rein-rings. B refers to a bow, which may be made from leather, chain, or other suitable material, and which is of such a length as to enable it to pass around over the upper teeth, under the upper lip, of the horse or animal, and have its ends united, by rings or otherwise, either to the rein-rings or to the mouth-bar A, short distances from the extremities of said bar or rein-rings—say at the point *b b*—which, in practice, would be about an inch and a quarter from said extremities.

It is obvious, by this construction, that the tongue or teeth of the horse cannot hold or control the bow B, by which the driver can punish and control an unmanageable horse with but little effort.

This device attracts the attention of the horse to a remarkable degree, which is a great desideratum.

The mode of attaching the bow to the mouth-bar as just (or laterally) set forth is preferable to that of connecting it to the rein-rings, as the latter method—uniting it to the rein-rings—would interfere with horse's drinking, as well as prevent its entire concealment in his mouth.

Having thus described my invention, what I claim, and desire to secure by Letters Patent, is—

The combination, with a bridle-bit, of the bow B, of sufficient length to pass around over the upper teeth and under the upper lip, and have its ends attached, by rings or otherwise, to the mouth-bar of the bit, short distances inwardly from its extremities, or to the rein-rings, substantially as and for the purpose set forth.

In testimony whereof I have hereunto signed my name in presence of two subscribing witnesses.

ARNOLD P. MASON.

Witnesses:
S. D. BROWN,
G. D. HOMER.